Nov. 3, 1931.  F. D. ROLLINS  1,830,719
HEATING DEVICE
Filed Feb. 11, 1931  3 Sheets-Sheet 1

Inventor

Fred D. Rollins

By (signature)

Attorney

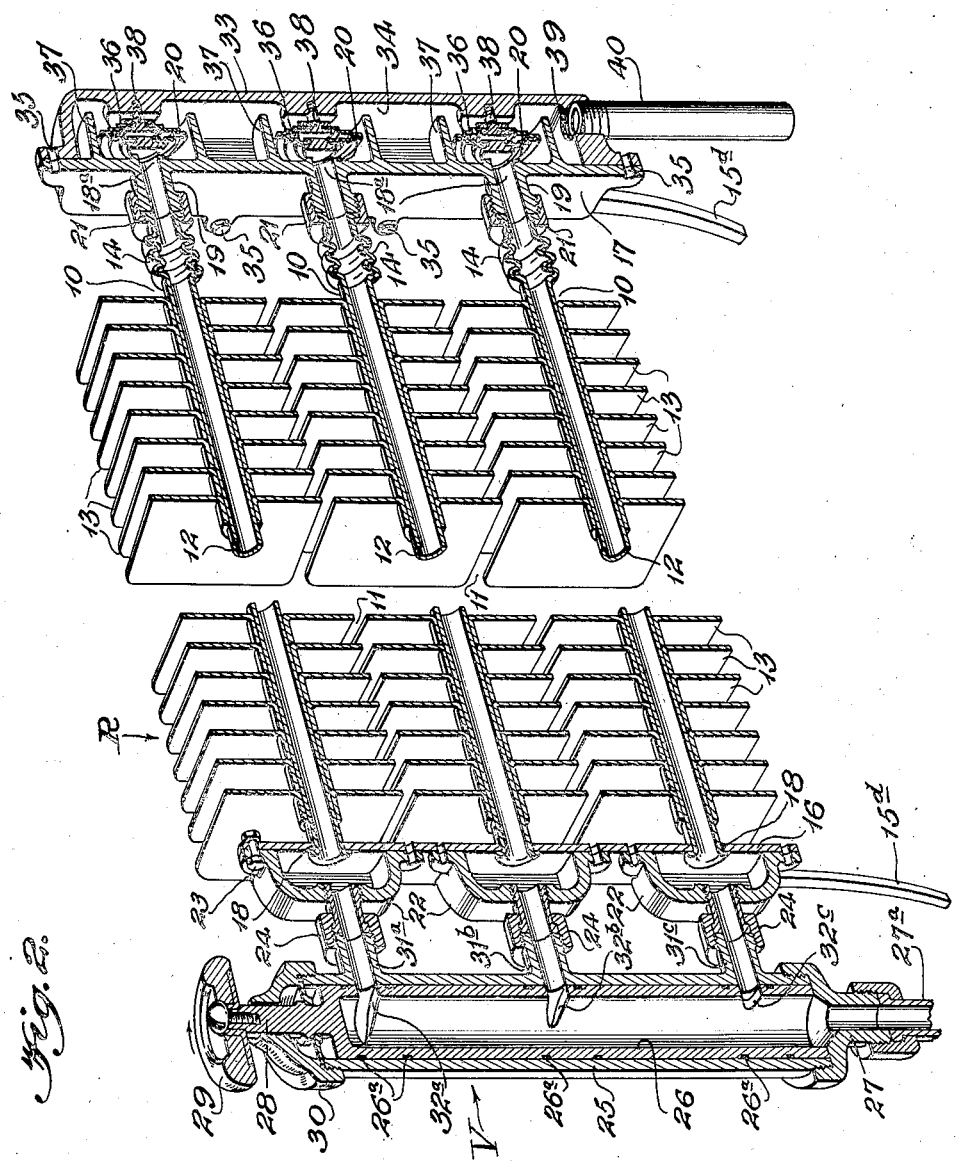

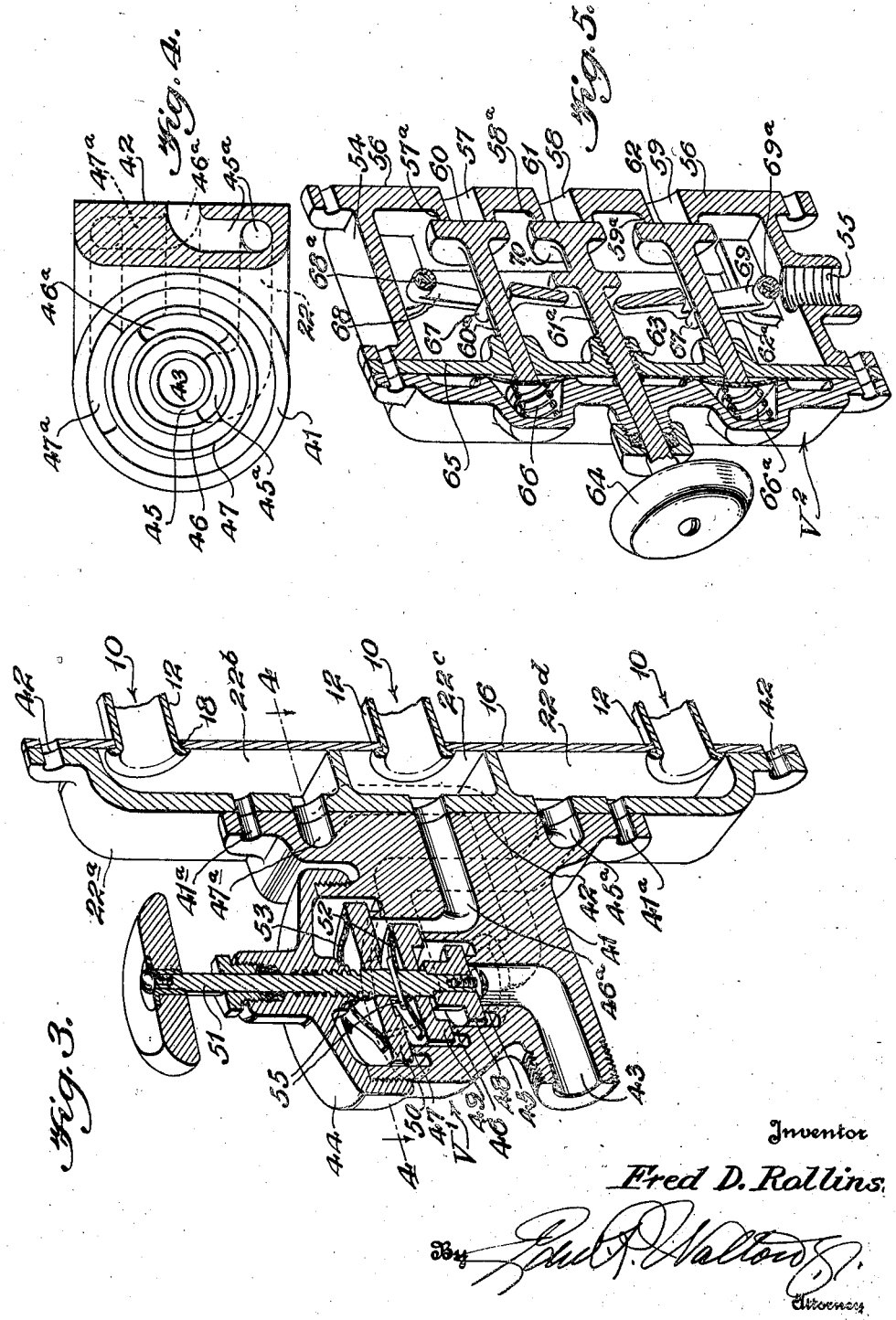

Patented Nov. 3, 1931

1,830,719

UNITED STATES PATENT OFFICE

FRED D. ROLLINS, OF WASHINGTON, DISTRICT OF COLUMBIA

HEATING DEVICE

Application filed February 11, 1931. Serial No. 515,072.

The present invention is directed to quick responsive modulation of heating units in varying degrees.

With known quick responsive room heating devices, such as so called "extended surface radiators" or as is otherwise known as "finned tube radiator," a room becomes quickly heated and, if turned off, the room temperature is quickly reduced thus necessitating too frequent manipulations of a manually operative control valve and, even should a thermostatic control valve be employed, it is still found that there is too much radiating surface in mild or moderate weather.

The principal object of the invention is the provision of a radiator having quickly heating and cooling sections controlled by a valve or valves in such a manner that any or all of the sections may be heated selectively so that the room temperature may be effectively and quickly regulated proportionately to the heating requirements by a single control.

Another object of the invention is the provision of a sectional "extended surface" or "finned tube radiator" wherein the extended surfaces of each section is separated from those of the other sections and valved in such a manner so that one is not appreciably heated by the other.

A further object of the invention is the provision of a heating unit for two-pipe systems which includes a radiator comprising a multiple of radiating sections of the quickly responsive type, a selective supply valve and a return trap mechanism, these elements being arranged in a unitary heating unit and in such manner as to allow the heating of any multiple of the radiator sections selectively, the supply valve making the selection and the return trap mechanism allowing passage of the air and the water of condensation to the return pipe but preventing the heating medium from passing back into the radiator section or sections which are not in use.

A still further object of the invention is the production of radiators for rooms and the like, as briefly described hereinabove, which will effectively perform the functions and objects desired to be obtained, yet which are quite simple in construction and arrangement rendering their manufacturing quite easy and inexpensive.

With the above and other objects in view, some of which will be obvious and others specifically mentioned, the invention resides in the sundry details of construction, combination and arrangements of parts hereinafter more fully described and pointed out in the appended claims.

In the accompanying drawings is illustrated several embodiments by which the present invention may be performed and in which:

Figure 2 is a vertical longitudinal sectional view in perspective of the heating device shown in Figure 1 but with the cabinet or casing removed;

Figure 3 is a sectional perspective of a modified form of valving means and inlet header for the radiator;

Figure 4 is a horizontal transverse sectional view taken substantially of line 4—4 of Figure 3;

Figure 5 is a sectional perspective of another form of valving means for the radiator of the present invention.

Figure 1:
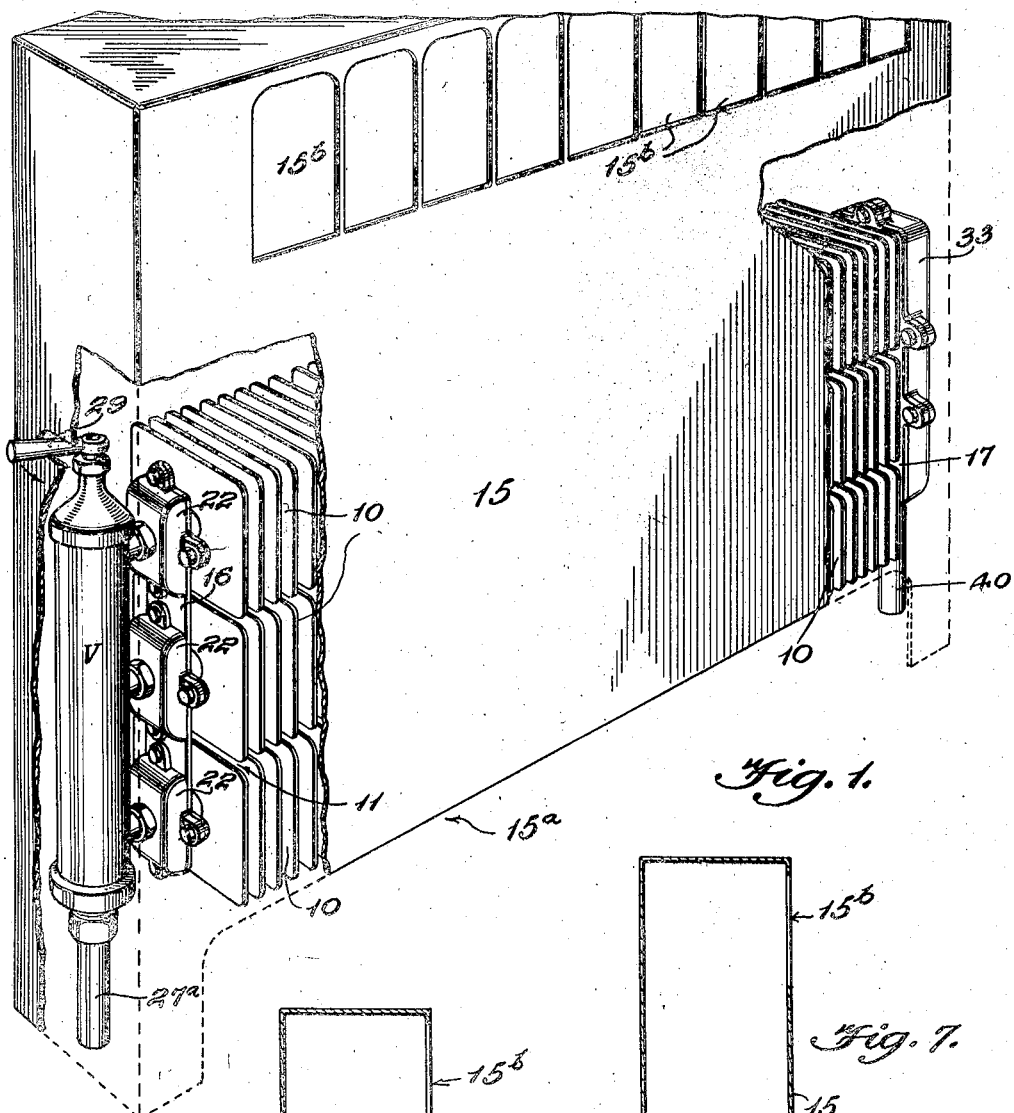
Figure 1 is a perspective view of a heating device in accordance with the present invention with parts broken away to illustrate enclosed structure.

Broadly stated, the heating unit or radiator R of the present invention includes two or more lengths or sections 10, preferably three in number, of so called extended surface heating elements arranged in any desired position or relation with respect to each other; however, it is at the present time thought preferable to arrange these sections horizontally in parallel relation with each section separated from the other. This separation can be provided in any manner most practical, although it is found that an air space or gap 11 is most desirable for this purpose as it will permit free circulation or passage of the air between the various sections and the fins thereof. While it is within the purview of the present invention to have these sections as separate independent elements, it is preferred to have them in a unitary structure suitably connected together by any suitable means and held thereby in their relative positions.

Each of these sections or elements 10 of the heating unit comprises one or more tubes 12, but preferably one as shown, having the plurality of fins 13 in the form of thin metal plates secured around the tube in spaced intervals, the space between adjacent fins being sufficient to provide free access and circulation of air there-between permitting the desired radiation. The fins are preferably plates having openings therein through which the tube or tubes extend, the edges of the openings being in intimate contact with the surface of the tube so as to absorb the heat therefrom, whereby the fins are highly heated. The area of the fins of each section, of course, may be of requisite dimensions to provide much greater radiating surfaces than would be provided by the surface area of the tube or tubes thereof.

Since the heating elements or sections may be selectively heated provision is made in any suitable manner for the differential of expansion of the element by means of expansion joints or the like, but this may be provided for by corrugating an end of the tubes 12 of each section as shown at 14 in Figure 2.

The intake ends of the sections 10 may be connected to a valve means V, V' or V² which may take the form of independent valves or of a multi-way valve. However, it is preferred to have the valve means operated by a single handle or single control and of such a character as may progressively open and close the heating sections to the admission of a heating medium, for the purpose of increasing or diminishing the heating surface area of the radiator, which, by virtue of the character of its heating sections, will quickly and effectively modulate the room temperature.

The fin-tube type of radiation is most effectively used in a cabinet or casing 15 having a lower air inlet opening 15a and an upper opening 15b to discharge the heated air which circulates by convection through the cabinet and passes the fins 12 of sections.

Figure 6:
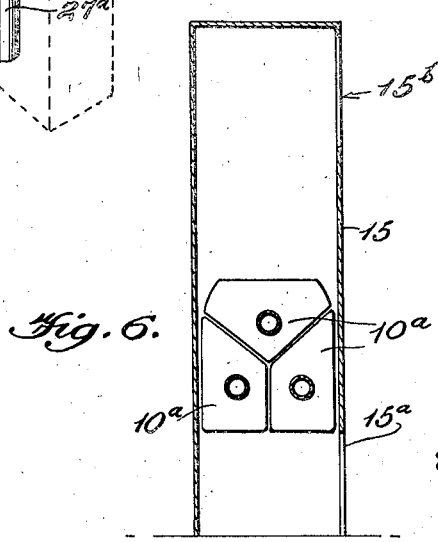
Figures 6 and 7 are vertical transverse sectional views through heating devices of the present invention but showing different arrangements or groupings of the heating elements or sections.
Figure 7:
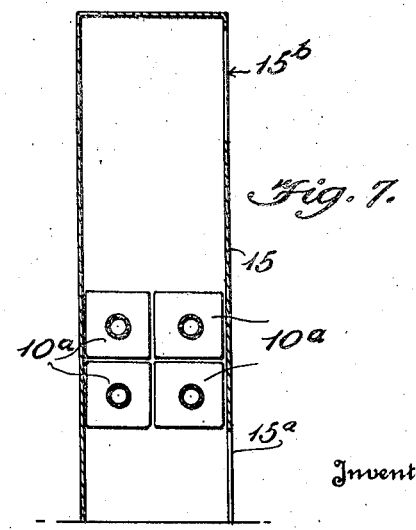

The heating sections of the radiator may be arranged and constructed as shown in Figures 6 and 7 where the sections 10a are grouped to form a substantial square in cross-section; but it is preferred to have the sections arranged in superposed spaced or separated relation, as shown in Figures 1, 2 and 3, and to have the valve means V connected thereto so that the heating medium is first admitted to the upper section and then, if desired, to the next lower section, and so on, and to close the section in reverse order. The advantage of this arrangement is that, due to the convection of air passing through the case or cabinet 15, heat from the section which is "on" will not heat up the adjacent sections and increase the heat radiating surface. This order of heating the sections, while desirable in some instances, may be departed from.

A trap mechanism T is employed, preferably at the ends of the sections, to cooperate with the valve means, for automatically allowing the passage of the air and water of condensation to the return conduit 44, but preventing the heating medium in the selected heating section or sections from passing back into the section or sections not in use or closed by the valve means. Thus it will be observed that the effective flow through the sections is only in one direction, that is, from the valving means to the trap mechanism.

More specifically stating the invention, the heating sections 10 are disposed between a pair of spaced end plates 16 and 17. Plate 16 is provided with a plurality of openings 18, through each one of which a tube of a heating section 10 extends and is suitably secured therein in an approved manner, such as by welding or the like.

Plate 17 is correspondingly formed with openings 18a, from the edges of which laterally extend threaded nipples 19 disposed on the inner face of the plate 17. On the outer face of the plate 17 extending around the openings 18a are valve seats 20. The return ends of the heating sections 10 are connected to the nipples 19 by means of a coupling 21 and, at this point, a suitable expansion or contraction compensating means may be provided in the form of an expansion joint, or, as indicated in the drawings, the extremity of the tubes 12 may be corrugated, as indicated at 14.

With the sections 10 secured to the plates 16 and 17, as above described, a unitary radiator structure is provided. If the radiator is to be used in a single pipe or non-return pipe system, the plate 17 may be eliminated and the ends of the heating tubes 12 closed in any approved manner, or the plate 17 may have the openings 18a thereof closed. To the plate 16 is secured a header plate or header plates 22.

With respect to Figures 1 and 2 of the drawings, the header plates are shown as being independent plates for each heating unit and are fastened to the plate 16 in any suitable manner, such as by bolts 23 or the like. In this form of the invention the headers 22 are each connected by couplings 24 to a core valve casing 25 in which a rotatable sleeve or core valve member 26 is disposed. Casing 25 has a reducing-nipple 27 on its lower end for connecting to a supply source 27a of heating medium, while through the other end of the casing 25 extends the valve stem 28 having a handle 29 on its end. A gland nut 30 closes the upper end of the casing and has the stem 28 rotatably extending therethrough. The cylindrical casing 25 has a plurality of ports 31a, 31b and 31c, therein corresponding to the number of heating sections 10 and each connected by a connection 24 to one of said headers 22. The sleeve or core 26 is provided with circumferential extending port slots 32a, 32b and 32c, each arranged to register respectively with the ports 31a, 31b, and 31c in the casing. However, the port slots 32a, 32b and 32c are of different lengths, as shown, so to be successively brought into communication to the ports in the casing 25. From the showing in the drawings, it will be clear that the valve core 26 has been moved to a position to open all of the ports 31, and admit the heating medium to all of said sections. Should it be desired to reduce the temperature it is only necessary to turn the handle 29 (in direction of the arrow) for a part of its rotative movement to close the port 31c; and a further movement will close the port 31b and a still further movement will close the port 31a. A reverse movement of the handle will correspondingly open said sections in the same order. Leakage between the port slots of the sleeve 26 is prevented by the circumferential packing ring 26a between said ports.

A header plate 33 is secured to the outer face of the plate 17. While a separate header may be provided for each section, it is preferred to have one header forming a common return chamber 34 for all of the heating sections 10. This header plate 33 is secured in end plate 17 in any suitable manner, such as by bolts 35. Carried by the header 33, at points opposite the seats 20 on plate 17, are thermo-valves 36 forming the steam trap mechanism T, which will cooperate with the adjacent seat 20 for opening and closing each of the respective heating sections according to the heating conditions, and which are provided to allow air and the water of condensation to pass to the return pipe 40 and prevent any appreciable amount of the heating medium from passing back into any of the sections not in use. These valves 36 may be of any approved construction or design that are suitable for the purposes intended. These valves 36 may be protected or partially shielded by hoods 37 extending from the outer surfaces of the plate 17 as indicated; and they are adjustably supported upon pins 38 whereby they may be regulated or adjusted with respect to the seats 20. A discharge opening 39 is provided at the bottom of the chamber 34 for connecting with a return pipe 40. The radiator may be supported in position through the medium of the supply pipes 27a and the return pipe 40 or the plates 16 and 17 may be provided with suitable depending legs or brackets 15d to engage with the floor or wall.

With respect to Figures 3 and 4 of the drawings the intake header 22a is shown as of unitary construction, having a valve means V' connected thereto and, further, being divided in passages or chambers 22b, 22c and 22d, connecting each of the heating sections 10 independently with the valve mechanism. The casing 41 of the valve mechanism V' has a corresponding number of passages 45a, 46a and 47a which extend to a surface 42 thereof abutting against and fastened to the head 22a by bolts or the like 41a, so as to connect respectively, with the passages 22b, 22c and 22d of the header 22a fastened directly to the supporting plate 16a of the heating sections 10 in any convenient manner such as by bolts 42.

With specific reference to the valve mechanism V' the valve casing 41 has a central supply passage 43 therethrough connectable at one end to a supply pipe and the other end opening into a valve chamber 44 and having a valve seat 45. Concentric with the seat 45 is a valve seat 46 of greater diameter, and also a valve seat 47 of greater diameter than the latter, all of said seats having a space between them and, being, preferably, but not necessarily positioned on different horizontal planes. Passages 45a are provided in the casing and extend from the spaces between valve seats 45 and 46, and passages 46a from between valve seats 46 and 47, while passages 47a extend from between the valve seat 47 and the side wall of the casing. Each of these groups of passages are controlled by concentric valves 48, 49 and 50, designed to cooperate with said seats respectively. These valves are concentrically arranged on a valve stem 51, the valve 48 being fixedly carried on the inner end of the valve stem and the valves 49 and 50 being slidable thereupon and the valve stem being of the rotatable lift type common in the art and having a handle 52 on its outer end. The valves 49 and 50 are normally seated by springs 52 and 53 positioned between them and abutments 55 on the stem to bear upon the valves respectively, for moving and holding them on their seats, when operated by said stem. It will thus be seen that when the valve stem 51 is partially rotated it will unseat the valve 48 and will permit the heating medium to pass from the passage 43 into the passage 45a which communicates with the passage 22b of the header 22a. Upon further opening movement of the valve stem the valve 49 will strike the valve 50 and cause it to be moved from its seat, whereby the heating medium will pass around said seat 46 through the passage 46a into the passage 22c of the header 22; and further opening movement of the stem will cause a corresponding operation of the valve 50. A reverse operation of the valve stem 51 will cause a closing movement of the valves in reverse order to their opening movement first described.

Another form of valve $V^2$, shown in Figure 5 may be used with the header 22a and comprises a casing 54 having an inlet supply opening 55 and a surface plate 56 which may be bolted or otherwise fastened to the header 22a similarly as the casing 41 of the valve $V^1$. The plate 56 is provided with a plurality of ports 57, 58 and 59, each having a valve seat 57a, 58a and 59a, within the casing which cooperates with disk valves 60, 61 and 62, which open and close said ports respectively. Valves 60 and 62 are poppet valves and the valve 61 is of a rotary lift type having a stem 61a threaded at 63 in an opening in the casing 54 and operated by a handle 64 on its outer end. The valves 60 and 62 have valve stems 60a and 62a respectively which reciprocate in openings in a guide-plate 65. Springs 66 and 66a are positioned between the walls of the casing 55 and the ends of said valve stems 60a and 62a to normally exert pressure on same to maintain the valves 60 and 62 upon their seats to close up the port openings 57 and 59. Each of the stems 60a and 62a are provided with extending abutments 67 positioned intermediate the length of the stems and which abutments are shown in the present disclosure as laterally extending pins. Lever arms 68 and 69 are pivoted at 68a and 69a in the casing 54, the arm 68 being positioned adjacent the valve stems 60a while the arm 69 is positioned adjacent the arm 62a, both arms having their distal end portions adapted to rest upon or to be engaged by an abutment 70 on the valve stem 61a. The abutments 67 are in such an arrangement that, when the valve 61 has been unseated by movement of the handle 64 to open the port 59, further movement of the valve 61 and its stem 61a will cause the abutment 70 to engage the arm 68 which in return will engage the pin 67 on the stem 60a to move the latter against the spring 66 and the valve 60; and, still further movement of the stem 61a will cause the arm 69 to similarly engage the pin 67 on the stem 62a to open the valve 62. A reverse movement of the handle 64 will cause a corresponding closing movement of said valves in reverse order. In the present arrangement, as shown in the drawings, the intermediate port 58 will be the first to be opened and if it is desired that this port should be connected to the uppermost heating section of the radiator described in the foregoing specification, the passages in the header 22a may be arranged so that the port 58 will be connected with the uppermost section of the radiator, the port 57 to the intermediate section of the radiator and the port 59 to the lowermost section of the radiator. It will of course be understood that the sections 10, the headers 22 and 22a and the valves V, $V^1$ and $V^2$ and other similar parts of the various forms of the invention may be interchanged one for the other.

In the practical heating art, thermo valves, water and steam traps, water seal traps, partition chamber traps, loop traps, float traps and many other like devices are generally referred to as "traps". Therefore, the term "trap", "trap means" or "trap mechanism", as referred to in the specification and claims is to be understood to mean any means, mechanism or device, known in the art, for permitting the outflow of air and water of condensation and normally preventing the outflow of the heating medium or the back flow from the return. In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may be embodied within the scope thereof.

Having thus fully described my invention what I claim as new and desire to secure by Letters Patent is:

1. A radiator comprising a plurality of horizontally disposed sections, said sections being arranged one above the other and separate from each other, means about said sections forming a flue having an air inlet opening and an upper heated air discharge opening, and operative valve means for admitting a heating medium to one or more of said sections at will, said valve means being so constructed and connected to said sections as to admit the heating medium first to the upper section and progressively to each of the lower sections.

2. A radiator comprising a plurality of horizontally disposed sections, said sections being arranged one above the other and separate from each other, means about said sections forming a flue having an air inlet opening and an upper discharge opening, and operative valve means for admitting a heating medium to one or more of said sections at will, said valve means being so constructed and connected to said sections as to admit the heating medium first to the upper section and progressively to each of the lower sections and for cutting off said heating medium to said sections in reverse order.

3. A radiator including, in combination, a plurality of separated quick responsive heating sections arranged together in a heating unit, a body secured to one end of said sections and having passages therein connectable to a source of common supply and each communicating with one of said sections; return trap means at the other end of said sections for controlling the flow of the heating medium through the respective sections; and valve means for controlling the admission of a heating medium from said common supply to the passages of said body, whereby one or more of the sections may be progressively opened or closed to the admission of the heating medium.

4. A radiator including, in combination, a plurality of separated heating sections arranged together in a heating unit, a body member secured to one end of said sections and having passages therein connectable to a source of common supply and each communicating with one of said sections; return means connected to the other end of said sections including trap means therein to close said last mentioned ends of the sections respectively; and single controlled valve means for controlling the admission of a heating medium from said common supply to the passages in said body member and of the character whereby one or more of the sections may be progressively opened or closed to the admission of the heating medium.

5. A radiator, including in combination, a plurality of extended surface heating elements arranged in side by side substantially parallel relation and connected together in a unitary structure, each element forming a section and being separated from adjacent sections, a header at each end of the assembled elements, the header at the intake end having a plurality of passages therein connectable to a source of common supply and each communicating with one of said sections respectively, trap means at the return ends of the sections for controlling the flow of the heating medium through the respective sections, and valve means for controlling the admission of a heating medium from said common supply to said sections and of the character that one or more of the sections may be selectively opened or closed to the admission of the heating medium.

6. A radiator, including a pair of spaced plates, a plurality of separated heating sections disposed between the plates and each section including one or more tubes having laterally extending fins in contact therewith, the ends of the tubes of each section being connected with the plates, respectively; a supply header having a plurality of passages therein secured to one of said plates with one of said passages communicating with the tubes of one of said heating sections respectively, operative valve means connected with the header and so arranged and constructed as to progressively open and close said passages of the header; and a second header secured to the said other plate and connected to a common return and having trap means therein for automatically preventing the heating medium from the selected heated section or sections from passing back into the other section or sections.

7. A radiator, including a pair of spaced plates, a plurality of separated heating sections disposed between the plates and each section being connected with the plates, a supply header having a plurality of passages therein secured to one of said plates with one of said passages communicating with one of said heating sections respectively, operative valve means connected with the header and so arranged and constructed as to progressively open and close said passages of the header; a second header secured to the said other plate and forming a collection chamber having an opening therein for connection with a return, and thermo-valves disposed and supported in said collection chamber and arranged one for each of said sections to open and close its communication with said chamber.

8. A radiator, including a pair of spaced plates having spaced openings therein, a plurality of spaced heating sections disposed between the plates, each section including one or more tubes surrounded by laterally extending fins in contact therewith, the ends of the tubes of each section being connected in openings in the plates, one of said plates having valve seats on its outer face and about the openings therein, a header secured to the outer face of said last plate and forming therewith a collection chamber having a discharge opening therein; thermo-valves disposed in said chamber and supported therein, one valve arranged for cooperation with each of said seats; and means, including a valve mechanism, connected with said other plate to supply a heating medium from a common source progressively to said sections.

9. A radiator having a plurality of heating sections each having an inlet and an outlet, and a single controlled means for effecting the flow of the heating medium into the sections selectively at their inlets, said means including elements at the outlets of said sections constructed and arranged to automatically allow the passage of the air or condensation through the sections but regulating a flow of the heating medium through the respective sections.

10. In a heating system having a common supply conduit and a common return conduit, a radiator connected in the system and having a plurality of heating sections, a single controlled selective valve means connected to the radiator for controlling the passage of the heating medium from said supply into the sections selectively, and return trap means connecting the radiator and the return and allowing passage of the air or water of condensation therefrom to said common return, and being constructed and arranged to automatically prevent the heating medium from the selected heated section or sections from passing back into the other section or sections.

In testimony whereof I have hereunto set my hand.

FRED D. ROLLINS.